US006734789B1

United States Patent
Ligard

(10) Patent No.: US 6,734,789 B1
(45) Date of Patent: May 11, 2004

(54) THEFT DETERRENT DEVICE

(76) Inventor: Thor H. Ligard, 8817 S. 92 E. Pl., Tulsa, OK (US) 74133

( * ) Notice: Subject to any disclaimer, the term of this patent is extended or adjusted under 35 U.S.C. 154(b) by 564 days.

(21) Appl. No.: 09/253,475

(22) Filed: Feb. 19, 1999

(51) Int. Cl.$^7$ ............................................... B60R 25/10
(52) U.S. Cl. ............................... 340/426.1; 340/425.5; 340/541; 340/426.11; 307/10.2
(58) Field of Search ............................... 340/426, 425.5, 340/541, 426.1, 426.11; 307/10.2

(56) References Cited

U.S. PATENT DOCUMENTS

| | | | | |
|---|---|---|---|---|
| 4,642,612 A | * | 2/1987 | Crump | 340/541 |
| 4,958,142 A | * | 9/1990 | Sayers | 340/426 |
| 5,394,139 A | * | 2/1995 | Dards | 340/541 |
| 5,398,016 A | * | 3/1995 | Burayez | 340/426 |
| 5,467,070 A | * | 11/1995 | Drori et al. | 340/426 |
| 5,619,872 A | * | 4/1997 | McCarthy | 70/209 |
| 5,796,330 A | * | 8/1998 | Vinette | 340/426 |
| 5,937,823 A | * | 8/1999 | Reeder et al. | 123/335 |

FOREIGN PATENT DOCUMENTS

| | | |
|---|---|---|
| DE | 24 36 782 | 7/1974 |
| DE | 3446815 C2 | 12/1984 |
| DE | 3527242 A1 | 7/1985 |

* cited by examiner

*Primary Examiner*—Julie Lieu
(74) *Attorney, Agent, or Firm*—Frank J. Catalano

(57) ABSTRACT

A theft deterrent device includes a source of deterrent fluid, a valve for gating release of deterrent fluid from the source, an electronic circuit including a motor for opening and closing the valve, a switch for electrically activating the device and a logic device responsive to a motion detector in the protected area for providing an electronic signal only while motion occurs in the protected area and responsive to the switch for activating the electronic circuit during the simultaneous occurrence of the device being in the electrically activated condition and the electronic signal being provided by the logic device to open the valve and discharge deterrent fluid from the source into the protected area. In an add-on mode of operation, the switch is preferably a component of an existing alarm system for the protected area. In a stand-alone mode of operation, the switch is preferably a radio transmitter remote from the device. In a special mode of operation useful to protect a motor vehicle, the device also includes a switch responsive to the rotation of a drive shaft of the vehicle for preventing activation of the valve motor electronic circuit while the shaft is rotating. The radio transmitter activates the electronic circuit regardless of the detection of motion in the protected vehicle. The receiver further responds to the transmitter to activate a warning device in the protected vehicle advising the intruder that deterrent fluid is going to be discharged into the protected vehicle.

21 Claims, 4 Drawing Sheets

TO FIGURE 1B

THEFT DETERRENT DEVICE

BACKGROUND OF THE INVENTION

This invention relates generally to theft deterrents and more particularly concerns a theft deterrent usable independently or in conjunction with an existing alarm system to discharge or introduce a deterrent fluid or sound into a protected area.

A device for discharging deterrent fluid or sound into a protected area is disclosed in U.S. Pat. No. 4,958,142 issued to Carol L. Sayers on Sep. 18, 1990. In the '142 patent, the device is connected to an existing alarm system and discharges deterrent fluid into a protected area at the end of a predetermined time after the existing alarm system is triggered. Deterrent fluid is discharged for a predetermined time period. When discharge terminates, the device automatically resets for subsequent intrusions.

The '142 patent device is usable exclusively as an addition to an existing alarm system. The device makes no provision for remote control by the owner. If the existing alarm system has been inadvertently triggered, deterrent fluid will be discharged for the full predetermined time of operation of the device unless the alarm is affirmatively interrupted by the user before the predetermined time delay has elapsed. The device is directly responsive to the triggering of the existing alarm and therefore is not independently responsive to motion in the protected area. Since the device discharges continuously for four minutes and then fully resets the system for a future intrusion, if an intruder opens windows and/or doors to exhaust the deterrent fluid from the protected area without subsequently performing an existing alarm triggering act, no further deterrent fluid will be introduced into the protected area by the device. The device is disclosed solely for use in a motor vehicle. No account is taken as to whether the protected vehicle is in operation at the time the deterrent fluid is discharged. No warning is given to an occupant of a moving vehicle that deterrent fluid is going to be imminently discharged into the vehicle. No opportunity to evacuate the vehicle prior to such a discharge is given to the occupant.

It is, therefore, an object of this invention to provide a theft deterrent device which may be effectively used in any enclosed area. It is also an object of this invention to provide a theft deterrent device which can be used in stand-alone or add-on applications. A further object of this invention is to provide a theft deterrent device which is triggered by motion in the protected area whenever the device is in an activated condition. Another object of this invention is to provide a theft deterrent device which is operable by remote control by the user. It is also an object of this invention to provide a theft deterrent device which will not place the fluid discharge or sound introduction circuit into an activated condition unless the demand for activation has been continuously made for a predetermined period of time. Yet another object of this invention is to provide a theft deterrent device usable to protect a motor vehicle. It is a further object of this invention to provide a theft deterrent device that will not discharge deterrent fluid into a moving motor vehicle. Still another object of this invention is to provide a theft deterrent device which warns the occupants of a motor vehicle of the impending discharge of the deterrent fluid into the vehicle. And it is an object of this invention to provide a theft deterrent device which intermittently discharges deterrent fluid or introduce deterrent sound into a protected area as long as motion is detected in the protected area.

SUMMARY OF THE INVENTION

In accordance with the invention, an anti-theft device is provided which will interrupt a break-in by discharging or introducing a sufficient quantity or volume of a deterrent fluid, such as pepper gas, tear gas or the like, or sound into a protected area to cause an intolerable level of discomfort to the intruder. The embodiment of the device herein described includes an electronic 'brain' automatically operating the system, an optional remote control permitting manual operation of the device, a motion detector input triggering operation of the activated system, a release mechanism such as a motor operated valve, a control circuit gating the deterrent fluid into the protected area, a battery and a deterrent fluid source. When triggered, the gas, liquid or particles (generally referred to as deterrent fluid) are injected or discharged into the protected room, car, safe or other area. The injection or discharge can be intermittently repeated within a certain time interval so that the area cannot be cleared of the deterrent fluid by merely rolling down or opening a window. An optional time delay prevents inadvertent operation of the fluid discharge circuit by remote control. Another optional time delay allows a protected motor vehicle to be evacuated before the deterrent fluid is discharged. The device can be used as an add-on unit with an existing burglar alarm system or as an independent unit.

In one embodiment, the device is secured in a lockable steel box approximately 1"×4"×6" and is electrically connected to the output of the existing burglar alarm system. If the electrical connection is interrupted while the alarm is deactivated, a line error is reported without releasing deterrent fluid. The device may be mounted in a closet, attic or other area and a deterrent fluid discharge tube extended from the device into the protected area. The device may be mounted in an HVAC system having its fan configured to operate when deterrent fluid is released so as to dispense the fluid into the room or area controlled by the HVAC unit. The device may be hidden in or behind pictures, paintings, vases, lamps or other objects located in the room/area to be protected and connected to the existing burglar system. An abort switch may be secreted in the system to permit interruption of the injection or discharge of deterrent fluid.

In another embodiment, the device also includes a motion detector so that no deterrent fluid will be released into the protected area until motion is detected. In this embodiment, the deterrent fluid can be sprayed directly at an intruder. Motion within five to ten feet of the device, or one to two feet in a motor vehicle application, would trigger the release of deterrent fluid in an activated system.

In a third embodiment, the device operates as an independent unit activated by a motion detector and a remote control. Red and green lights indicate the activated or deactivated status of the device, respectively, preferably intermittently blinking and in an "off" condition for the majority of the time. This embodiment is specially suited for use in motor vehicles. In motor vehicle applications, release of deterrent fluid is prevented while the motor vehicle is in motion. Furthermore, a deterrent fluid pipe line valve concealed in the vehicle proximate the deterrent fluid source permits the user to manually assure that deterrent fluid cannot be released while the user is operating the vehicle.

Preferably, the device includes a source of deterrent fluid, a valve for gating release of deterrent fluid from the source, an electronic circuit including a mechanism such as a motor for opening and closing the valve, a switch for electrically activating the device and a logic device responsive to a motion detector in the protected area for providing an electronic signal only while motion occurs in the protected area and responsive to the switch for activating the electronic circuit during the simultaneous occurrence of the device being in the electrically activated condition and the electronic signal being provided by the logic device to open the valve and discharge deterrent fluid from the source into the protected area. The electronic circuit can cause the motor to open and close the valve intermittently during the simultaneous occurrence above described or can cause the motor to remain open continuously during that simultaneous occurrence. In an add-on mode of operation, the switch is preferably a component of an existing alarm system for the protected area, the switch being normally open when the existing alarm system is activated but not triggered. In a stand-alone mode of operation, the switch is preferably a radio transmitter remote from the device with a receiver responsive to the transmitter switching the device to an electrically activated condition.

In a special mode of operation useful to protect a motor vehicle, the device also includes a switch responsive to the rotation of a drive shaft of the vehicle for preventing activation of the valve motor electronic circuit while the shaft is rotating. In this special mode, a radio transmitter remote from the device signals a receiver responsive to a first operation of the transmitter to activate the electronic circuit when the vehicle drive shaft is not rotating regardless of the detection of motion in the protected vehicle. Preferably, a first time delay circuit delays activation of the electronic circuit until the transmitter has been continuously activated for a first predetermined time period and a second time delay unit delays activation of the electronic circuit for a second predetermined time period after the first predetermined time period has elapsed. It is also preferred that the receiver further responds to the first operation of the transmitter to activate a warning device in the protected vehicle after the first predetermined time period has elapsed to advise the intruder that deterrent fluid will be discharged into the protected vehicle after the second predetermined time period has elapsed. Also, in this special mode, the receiver responds to a second operation of the transmitter to deactivate the electronic circuit.

BRIEF DESCRIPTION OF THE DRAWINGS

Other objects and advantages of the invention will become apparent upon reading the following detailed description and upon reference to the drawings in which.

While the invention will be described in connection with a preferred embodiment and method of operation, it will be understood that it is not intended to limit the invention to those embodiments or methods. On the contrary, it is intended to cover all alternatives, modifications and equivalents as may be included within the spirit and scope of the invention as defined by the appended claims.

DETAILED DESCRIPTION

Figure 1A:
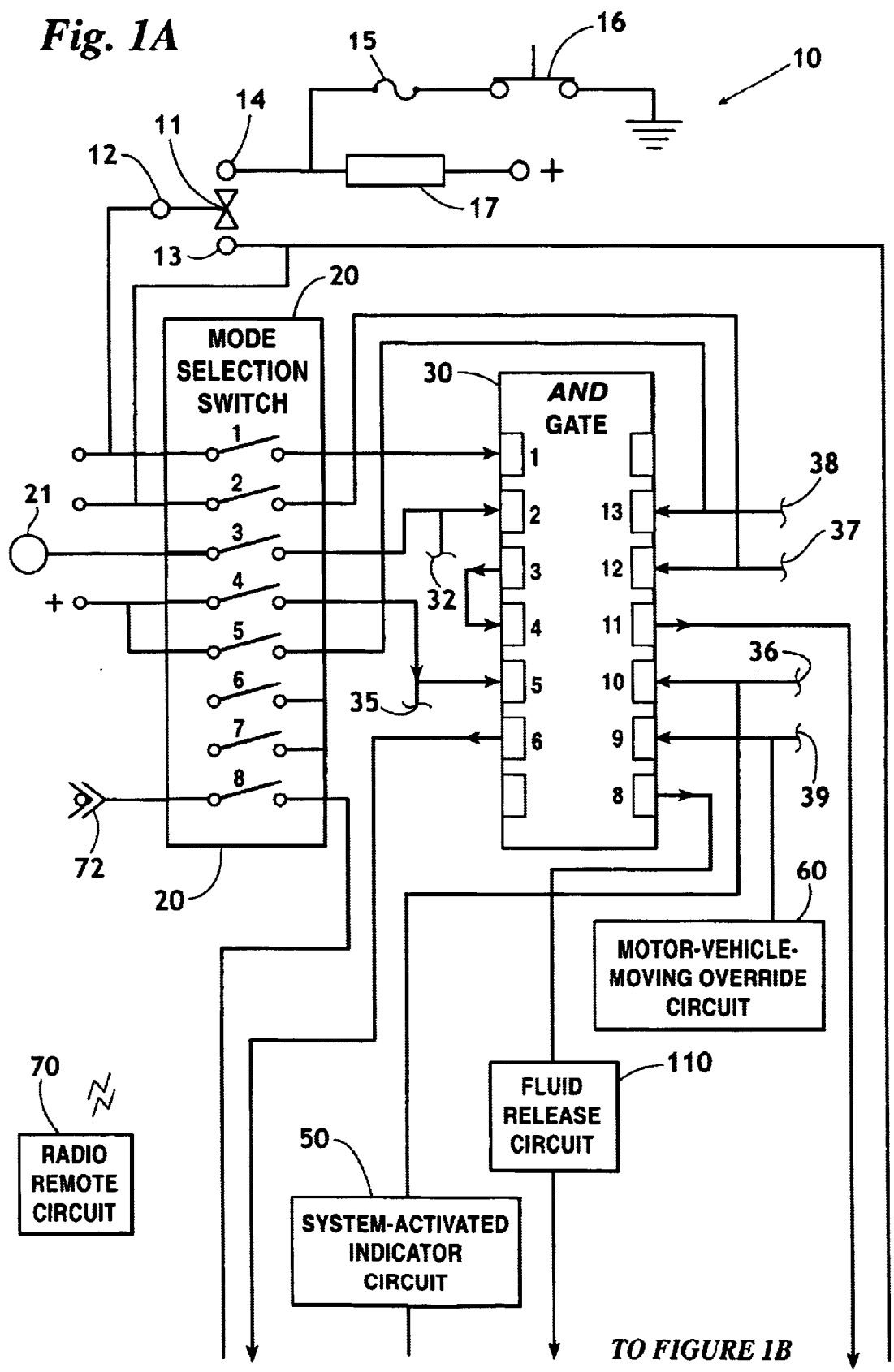
FIG. 1 is an electrical block diagram of a preferred embodiment of the deterrent device.
Figure 1B:
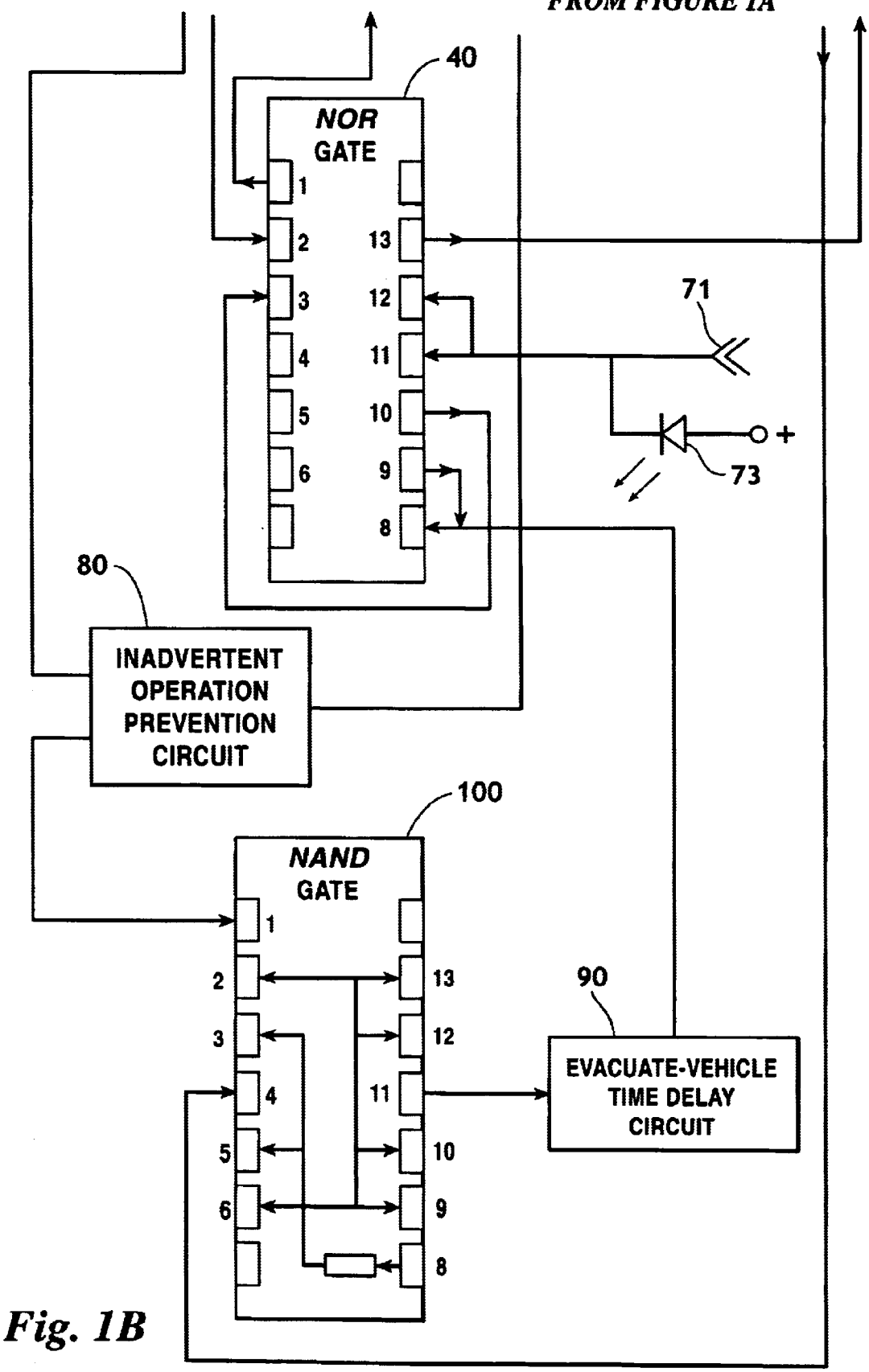

Looking first at FIG. 1, the theft deterrent device includes a select implementation circuit 10, a mode selection switch 20, an AND gate 30, a NOR gate 40, a system-activated indicator circuit 50, a motor-vehicle-moving override circuit 60, a radio remote circuit 70, an inadvertent operation prevention circuit 80, an evacuate-vehicle time delay circuit 90, a NAND gate 100 and a fluid release circuit 110.

The select implementation circuit 10 permits the user to implement the deterrent device as an add-on to an existing alarm or as a stand-alone unit. It includes a double throw switch 11 having its common point 12 connectable between a stand alone position 13 and an add-on position 14. The add-on position 14 is connected through a circuit protector 15 and an activation switch 16 to ground and through a resistor 17 to a voltage source. Preferably, the activation switch 16 is a component of the existing alarm system (not shown) to which the deterrent device is added.

The user may select the mode of operation of the device by use of the digital mode switch 20. As shown in the preferred embodiment, the switch 20 has an input 20-1 connected to the common point 12 of the implementation switch 11, an input 20-2 connected to the stand-alone position 13 of the implementation switch 10, an input 20-3 connected to a motion detector 21 located in the area to be protected or on the lockable steel box containing the device components, inputs 204 and 20-5 connected to a positive voltage source 22 and an input 20-8 connected to a radio signal receiver 71. The mode switch 20 permits the user to choose an add-on mode of operation, a stand-alone mode of operation or a special add-on mode of operation.

The configuration of the theft deterrent device is best understood in relation to each of its three operational modes.

Add-on Mode

In the add-on mode of operation, the deterrent device is connected to an existing alarm system (not shown). The mode switch 20 is configured with inputs 20-1, 20-3 and 20-4 closed. The AND gates 30-2, 30-5 and 30-9 are connected through resistors to ground (not shown) at points 32, 35 and 39, respectively. The implementation switch 11 is in the add-on position 14. If the device is to be used to protect the contents of a motor vehicle, the motor vehicle moving override circuit 60 is configured to prevent release of deterrent fluid while the motor vehicle is moving. In the add-on mode, when the existing alarm system is activated, the activating switch 16 is automatically opened and a logic 1 is given through the implementation switch 11 and the mode switch 20-1 to the AND gate input 30-1. If movement subsequently occurs in the protected area, the motion detector M provides a 1 through mode selection switch 20-3 to the AND gate input 30-2. This results in a 1 being transmitted from an AND gate output 30-3 to an AND gate input 30-4. Since a 1 is also provided through the mode switch 20-4 to an AND gate input 30-5, a 1 is then transmitted from an AND gate output 30-6 to a NOR gate input 40-2. This causes a NOR gate 40-1 to flip from 1 to a logic 0, opening the indicator circuit 50 and providing a 1 to an AND gate 30-10. If the device is not used with a motor vehicle or if the device is used with a motor vehicle but the vehicle is not moving, an AND gate 30-9 will already have a 1 from the override circuit 60. Therefore, an AND gate 30-8 becomes 1 and activates the fluid release circuit 110. Deterrent fluid is then released into the protected area. The operation of the fluid release circuit 110 is hereinafter explained. Preferred embodiments of the general mode indicator circuit 50 and the motor vehicle-moving override circuit 60 are hereinafter explained in detail.

Thus, in the add-on mode, if the existing alarm is activated and motion occurs in the protected area, the fluid discharge circuit is activated. The diffusion of deterrent fluid will be terminated if motion ceases or if the alarm is disconnected.

Stand-alone Mode

In the stand-alone mode of operation, the deterrent device is used independently of any other system. The mode switch 20 is configured with inputs 20-1, 20-3 and 20-4 closed as in the add-on mode, but the implementation switch 11 is in the stand-alone position 13. The motor vehicle override circuit 60 is configured to prevent release of deterrent fluid into a protected motor vehicle while it is moving, as in the add-on mode. In the stand-alone mode, the user activates the system by use of the radio remote 70 having a receiver 71 connected at point 71 to the NOR gates 40-11 and 40-12. Operation of the radio remote 70 changes NOR gates 40-11 and 40-12 from 1 to 0. NOR gate 40-13 thus becomes 1 which is applied to the mode switch 20-1 through the implementation switch 11. The AND gate 30-1 receives the 1 from the mode selection switch 20-1 and the device thereafter operates identically as described above in the add-on mode. Preferably, the remote circuit 70 includes a light emitting diode (LED) 73 connected to a positive voltage source. The LED 73, when lit, indicates that the system is activated and will discharge deterrent fluid if motion is detected in the protected area. Preferably, sequential operations of the remote 70 will flip-flop the device 70 into and out of the activated condition and the LED 73 on and off.

Special Add-on Mode

In the special add-on mode of operation, the deterrent device is connected to an existing alarm system (not shown) in a motor vehicle and is configured to deal with a hijack situation as well as to protect the vehicle contents. The mode switch 20 is configured with inputs 20-1, 20-2, 20-3, 20-4, 20-5 and 20-8 closed and with the implementation switch 11 in the add-on position 14. In the special add-on mode, the device is connected identically as in the add-on mode and operates in the same manner, but additional operations are being performed as hereinafter explained. AND gates 30-10, 30-12 and 30-13 are connected through resistors to ground (not shown) at points 36, 37 and 38, respectively. With the mode switch 20-5 closed, a 1 is present at the AND gate 30-13. If the operator uses the radio remote control, the NOR gates 40-11 and 40-12 get a 0 resulting in a 1 at the NOR gate 40-13 which in turn provides a 1 through the mode switch 20-2 to the AND gate 30-12. Since the mode switch 20-5 already provides a 1 at the AND gate 30-13, the AND gate 30-11 provides a 1 to a NAND gate 1004. The remote signal also provides a 0 through the mode switch 20-8 to the inadvertent operation prevention circuit 80. This circuit 80 provides a time delay, preferably of approximately ten seconds, such that, if the remote 70 is held in a closed condition for the time delay period, a NAND gate 100-1 will flip from 1 to 0. Thus, a NAND gate 100-8 will flip from 0 to 1 and be maintained in this condition even if the remote is released. In this activated condition, the evacuate vehicle time delay circuit 90 receives a 1 from a NAND gate 100-11. The evacuate vehicle time delay circuit 90 preferably provides an approximately twenty second delay period after the radio remote 70 has been operated and before deterrent fluid will be released into the vehicle. At the end of the time delay period, the evacuate vehicle time delay circuit 90 causes the NOR gates 40-8 and 40-9 to change to 0 and a NOR gate 40-10 to change to a 1 which is transmitted to a NOR gate 40-3. This causes the NOR gate 40-1 to flip from 1 to 0, operating the indicator circuit 50 and providing a 1 at the AND gate 30-10. As soon as the motor vehicle is in a stationary condition, the motor vehicle override circuit 60 will operate to provide a 1 at the AND gate 30-9, and the AND gate 30-8 will therefore get a 1 and activate the fluid release circuit 110. In this configuration, deterrent fluid will be released into the vehicle in response to the radio remote 70 even if no movement has been detected by the motion detector 21. If the user operates the radio remote 70 a second time, the NAND gate 100 will be reset and discharge of deterrent fluid into the motor vehicle will be terminated. It is anticipated that an audible or visible signal within the motor vehicle will advise the occupant that when the delay time has elapsed, deterrent fluid will be discharged into the vehicle, thus giving the occupant an opportunity to exit the vehicle before this occurrence.

System Activited Indicator Circuit

Figure 2:
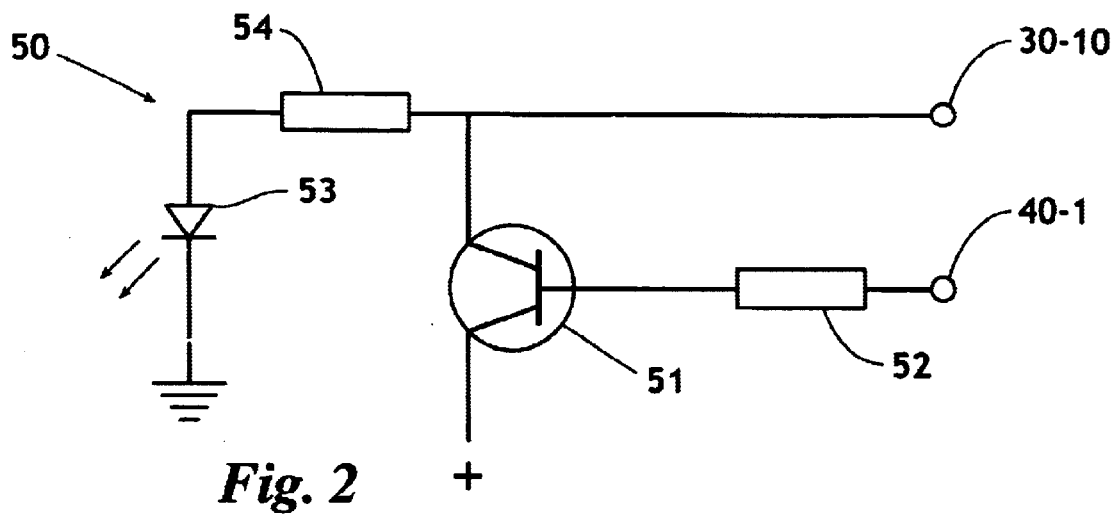
FIG. 2 is an electrical schematic diagram of a preferred embodiment of the system-activated indicator circuit of the deterrent device.

A preferred embodiment of the system activated indicator circuit 50 is illustrated in FIG. 2. The base of a PNP transistor 51 is connected through a resistor 52 to the NOR gate output 40-1. The emitter of the transistor 51 is connected to a positive voltage source. When the NOR gate 40-1 flips from 1 to 0, the collector of the transistor 51 drives the AND gate 30-10 to a 1 and also drives the light emitting diode 53 through a resistor 54 to indicate that the device is activated.

Motor-vehicle-moving Override Circuit

Figure 3:
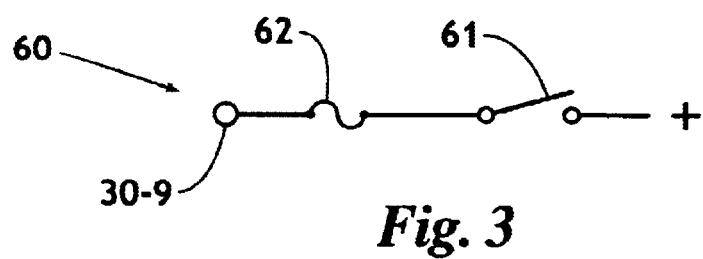
FIG. 3 is an electrical schematic diagram of the preferred embodiment of the motor-vehicle-moving override circuit of the deterrent device.

A preferred embodiment of the motor vehicle moving override circuit 60 is illustrated in FIG. 3. A normally open switch 61 is connected through a circuit protector 62 to an AND gate input 30-9. The normally open switch 61 is of a type such as may be connected to a motor vehicle wheel or axle and will stay in the open condition while the motor vehicle is moving, thus preventing operation of the fluid release circuit 110. The switch 61 will flip to the closed condition when the motor vehicle ceases to move. Closing the switch 61 therefor flips the AND gate 30-9 to 1, permitting operation of the fluid release circuit 110.

Inadvertent-operation Prevention Circuit

Figure 4:
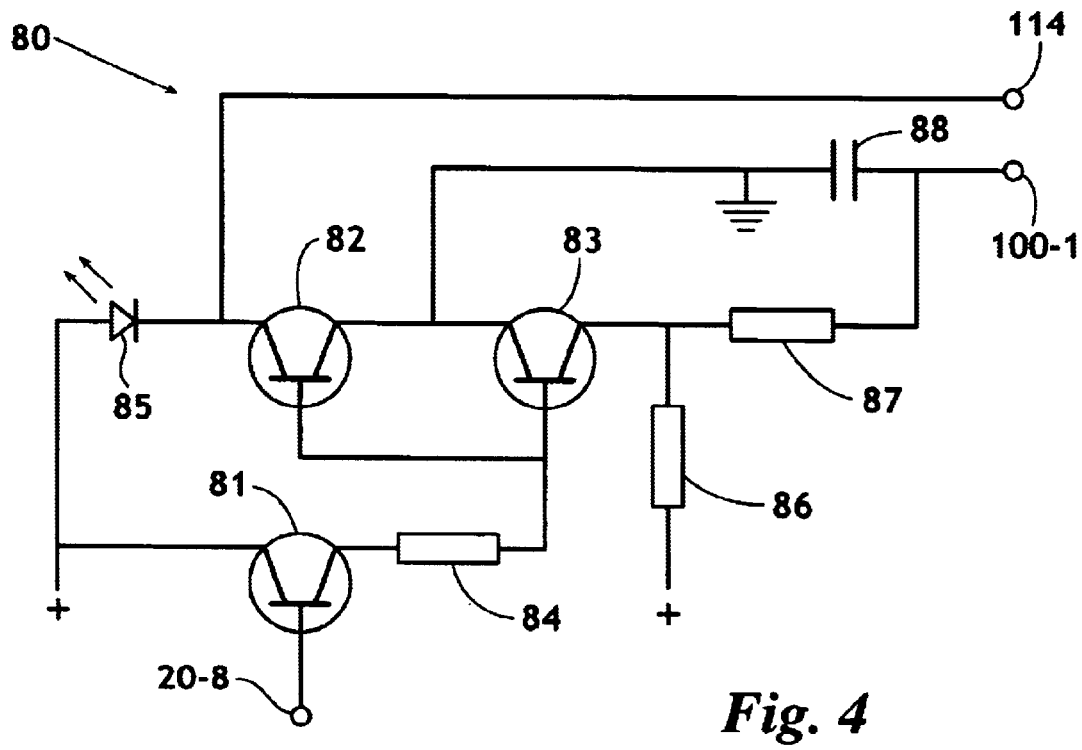
FIG. 4 is an electrical schematic diagram of a preferred embodiment of the inadvertent operation prevention circuit of the deterrent device.

A preferred embodiment of the inadvertent-operation prevention circuit 80 is illustrated in FIG. 4. In the special add-on mode, mode switch 20-8 provides a 0 to the base of a PNP transistor 81. The emitter of the transmitter 81 is positively biased and the bases of a pair of NPN transistors 82 and 83 are connected to the collector of the PNP transmitter 81 through a resistor 84. The emitter of the NPN transistors 82 and 83 are grounded. The collector of the first NPN transistor 82 is connected to a switch 114 in the fluid discharge circuit 110 and through an LED 85 to the positive voltage source. The collector of the second NPN transmitter 83 is connected through one resistor 86 to the positive voltage source and through a second resistor 87 to a grounded capacitor 88 and to a NAND gate 100-1.

When the remote 70 is operated, the receiver at point 72 causes the transistor base to become 0. Thus, transistors 81, 82 and 83 are all on. If the remote 70 is maintained in continuous operation for a preselected period of time, the capacitor 88 discharges through the resistor 87 and the second NPN transistor 83 to cause the NAND gate 100-1 to flip from 1 to 0. A light emitting diode 85 indicates that the fluid release circuit 110 will be activated if motion occurs in the protected area. The capacitor 88 and resistor 87 are selected to provide the desired time delay between operation of the remote 70 and operation of the switch 114 in the fluid release circuit 110. An approximately ten second delay is preferred, but the actual time will depend on the particular application of the device.

Evacuate-vehicle Time Delay Circuit

Figure 5:
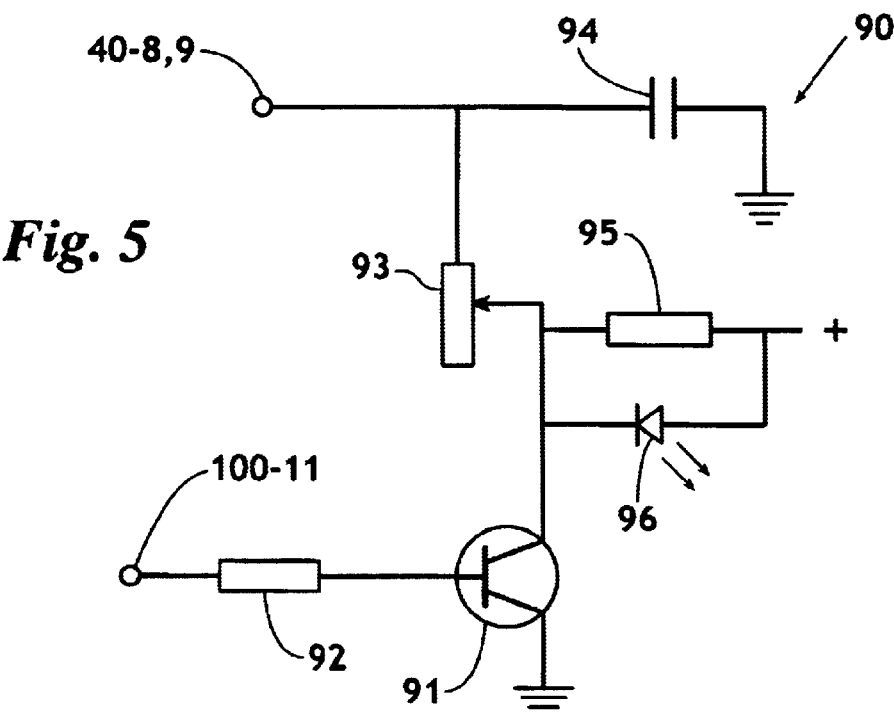
FIG. 5 is an electrical schematic diagram of a preferred embodiment of the evacuate vehicle time delay circuit of the deterrent device.

The preferred embodiment of the evacuate-vehicle time delay circuit is illustrated in FIG. 5. The circuit 90 consists of an NPN transistor 91 having its base connected through a resistor 92 to the NAND gate 100-11. The emitter of the NPN transistor 91 is grounded. The collector of the NPN transistor 91 is connected through a variable resistor 93 and a capacitor 94 to ground and through the variable resistor 93 to the NOR gates 40-8 and 49-9. The collector is also connected to a positive voltage source through a resistor 95 and an LED 96 across the resistor 95. Even if the remote 70 is disconnected after the time delay provided by the inadvertent operation prevention circuit 80, the capacitor 94 will discharge through the resistor 93 and the NPN transistor 91 and, after the preselected time determined by the variable resistor 93 and the capacitor 94, will change the NOR gates 40-8 and 40-9 to a 0, thus assuring that the fluid discharge circuit 110 will operate after the preselected time. This delay affords an opportunity for the occupant, when alerted by an in-vehicle audible or visible warning, to evacuate the vehicle before deterrent fluid is discharged. The light emitting diode 96 indicates to the user that the selected time delay has elapsed and that deterrent fluid is being released into the protected area.

Fluid Discharge Circuit

Figure 6:
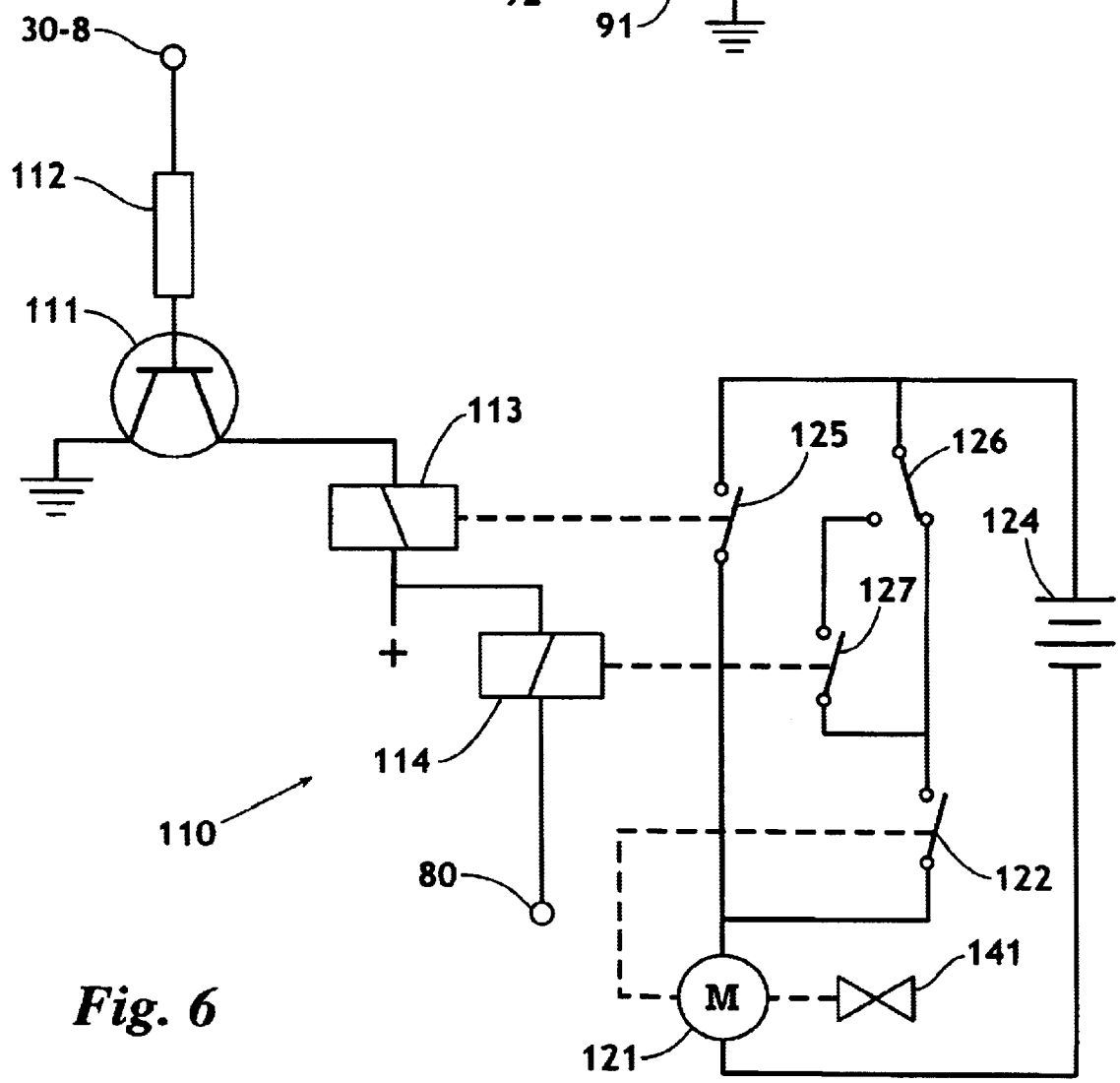
FIG. 6 is an electrical schematic diagram of a preferred embodiment of the fluid release circuit of the deterrent device.

A preferred embodiment of the fluid discharge circuit 110 is illustrated in FIG. 6. An NPN transistor 111 has a grounded emitter and has its base connected through a resistor 112 to the AND gate 30-8. The collector of the NPN transmitter 111 is connected through a main fluid release switch 113 to a positive voltage source. A secondary fluid release switch 114 is connected between the positive voltage source and the inadvertent operation prevention circuit 80. A motor 121 operates the fluid valve 141, opening and closing the valve 141 during each rotation of the motor shaft. The motor 121 also simultaneously operates a pair of switches 122 and 123, one normally opened and the other normally closed. The motor 121 is connected to a power source such as a battery 124 through the normally closed motor switch 123 and a normally open switch 125. The switch 125 is operated in response to the main switch 113 in the fluid discharge circuit 110. Thus, once motion occurs in the protected area and the protected area is not a moving motor vehicle, the motor 121 will operate until the normally closed motor switch 123 opens and the normally opened motor switch 122 closes. The motor 121 is also connected to the battery 124 through a selector switch 126 either through the normally opened motor switch 122 or through a normally opened secondary switch 127 operated by the secondary switch 114 in the inadvertent operation prevention circuit 80 and the normally opened motor switch 122. Thus, when the normally opened motor switch 122 is closed and the normally closed motor switch 123 is opened, the motor 121 will operate if the selector switch 126 is connected directly to the normally opened motor switch 122. In this event, the motor 121 will continue to operate, turning the flow of deterrent fluid on and off as long as the motor 121 continues to operate. However, if the selector switch 126 is connected through the secondary switch 127, the motor 121 will not continue to run unless the secondary switch 114 is operated by the inadvertent operation prevention circuit 80. Thus, the motor 121 will operate for only one half turn and the deterrent fluid will be continuously rather than intermittently released.

Thus, when the fluid discharge circuit 110 is operated through the AND gate 30-8, and the selector switch 126 is in the desired position, the motor 121 will run until the normally closed motor switch 123 opens, at which point the motor 121 will stop. The fluid valve 141 will remain open regardless of the existence of any additional movement in the protected area and deterrent fluid will be continuously discharged into the protected area. When the main switch 113 operates and the selector switch 126 is in the direct position, the motor 121 will continue to run as long as the switch 113 is energized. In this condition, the fluid valve 141 opens and closes during each turn of the motor 121 and, as long as there is movement in the area protected, the motor 121 will continue to run and the fluid discharge valve will continue to open and close. In the radio remote operation, when the mode switch 20-8 is closed and the switch 125 is in the indirect position, the fluid discharge valve 141 will remain in an open condition. If the remote button is operated for approximately one second, a 0 will be applied through the remote mode switch 20-8 to the transistor 81 in the inadvertent operation prevention circuit 80. When this happens, the circuit 80 causes the switch 114 to be energized and power will be provided to the motor 121 through the selector switch 126, the secondary switch 127 associated with the switch 114 and the normally opened motor switch 126 and will return to the start position if no further movement occurs in the protected area.

Conclusion

A prototype of the anti-theft device which has been satisfactorily tested employs the following components:

| Component | Number | Description |
| --- | --- | --- |
| Motion Detector | | Radio Shack Cat No. 49-425 |
| Remote Control | 70 | Radio Shack Cat. No. 61-2667 Receiver/Transmitter Wireless Remote Switch |
| Spray Box | | Tear Gas and Pepper Gas |
| Batteries | 124 | Two 1.5 volt for motor |
| Battery | Not shown | 9 Volt for Motion detector |
| Switches | 113 and 114 | 5 Volt PC Relays |
| AND Gate | 30 | CD 74 HTC 08 E Dip |
| NOR Gate | 40 | CD 74 HTC 02 E Dip |
| NAND Gate | 100 | CD 74 HTC 00 E Dip |
| Transistor | 51 | CEN 424 EBC PNP |
| Transistor | 81 | CEN 424 EBC PNP |
| Transistor | 82, 83 | N 524 MPS A05 NPN |
| Transistor | 91 | NP 930 EBC NPN |
| Transistor | 111 | N 524 MPS A05 NPN |

While the invention has been described in conjunction with specific embodiments and methods of operation thereof, it is evident that many alternatives, modifications and variations will be apparent to those skilled in the art and in light of the foregoing description. Accordingly, it is intended to embrace all such alternatives, modifications and variations as fall within the spirit of the appended claims.

What claimed is:

1. A device for deterring the presence of an intruder in a protected area comprising:
    a source of a deterrent medium;
    a valve for gating release of the deterrent medium from said source;
    an electronic circuit including a means for operating said valve;
    means for switching the device to an electrically activated condition;
    means responsive to a motion detector in the protected area for providing an electronic signal only while motion occurs in the protected area; and
    means responsive to said switching means and to said motion responsive detector means for activating said electronic circuit during the simultaneous occurrence of the device being in said electrically activated condition and said electronic signal being provided to open said valve and issue the deterrent medium from said source into the protected area.

2. A device according to claim 1, said electronic circuit causing said operating means to open and close said valve intermittently during said simultaneous occurrence.

3. A device according to claim 1, said electronic circuit causing said operating means to cause said value to remain open continuously during said simultaneous occurrence.

4. A device according to claim 1, said switching means comprising a switch in an existing alarm system for the protected area, said switch providing a signal when the existing alarm system is activated and triggered.

5. A device according to claim 4, said switch being normally open when the existing alarm system is activated but not triggered.

6. A device according to claim 1, said switching means comprising a radio transmitter remote from the device and a receiver responsive to said transmitter to switch the device to an electrically activated condition.

7. A device according to claim 1 further comprising means responsive to the rotation of a shaft for preventing activation of said electronic circuit while the shaft is rotating.

8. A device according to claim 1, said deterrent medium being a fluid.

9. A device according to claim 1, said operating means comprising an electric motor.

10. A device for deterring the presence of an intruder in a protected motor vehicle comprising:
    a source of a deterrent medium;
    a valve for gating release of the deterrent medium from said source;
    an electronic circuit including means for operating said valve;
    means for switching the device to an electrically activated condition;
    means responsive to a motion detector in the protected vehicle for providing an electronic signal only while motion occurs in the protected vehicle;
    means responsive to said switching means and to said motion detector responsive means for activating said electronic circuit during the simultaneous occurrence of the device being in said electrically activated condition and said electronic signal being provided to operate said valve and discharge the deterrent medium from said source into the protected area; and
    means responsive to the rotation of a drive shaft of the vehicle for preventing activation of said electronic circuit while the shaft is rotating.

11. A device according to claim 10, said deterrent medium being a fluid.

12. A device according to claim 10, said operating means comprising an electric motor.

13. A device according to claim 10 further comprising a radio transmitter remote from the device and a receiver responsive to a first operation of said transmitter to activate said electronic circuit activating means when the vehicle drive shaft is not rotating regardless of the detection of motion in the protected vehicle.

14. A device according to claim 13 further comprising first means for delaying activation of said electronic circuit activating means in response to said first operation of said transmitter until said transmitter has been continuously activated for a first predetermined time period.

15. A device according to claim 14 further comprising second means for delaying activation of said electronic circuit activating means for a second predetermined time period after said first predetermined time period has elapsed.

16. A device according to claim 15, said receiver further being responsive to said first operation of said transmitter to activate a warning device in the protected vehicle after the first predetermined time period has elapsed advising the intruder that the deterrent medium will be introduced into the protected vehicle after the second predetermined time period has elapsed.

17. A device according to claim 13, said receiver responsive to a second operation of said transmitter to deactivate said electronic circuit activating means.

18. A device according to claim 10, said electronic circuit causing said operating means to open and close said valve intermittently during said simultaneous occurrence.

19. A device according to claim 10, said electronic circuit causing said operating means to remain open continuously during said simultaneous occurrence.

20. A device according to claim 10, said switching means comprising a switch in an existing alarm system for the protected vehicle, said switch providing a signal when the existing alarm system is activated and triggered.

21. A device according to claim 20, said switch being normally open when the existing alarm system is activated but not triggered.

* * * * *